(12) United States Patent
Sharp

(10) Patent No.: US 11,344,007 B2
(45) Date of Patent: May 31, 2022

(54) BIRD FEEDER WITH MULTIPLE FEED RESERVOIRS AND FEED STATIONS

(71) Applicant: Raymond Sharp, Las Vegas, NV (US)

(72) Inventor: Raymond Sharp, Las Vegas, NV (US)

( * ) Notice: Subject to any disclaimer, the term of this patent is extended or adjusted under 35 U.S.C. 154(b) by 182 days.

(21) Appl. No.: 16/906,733

(22) Filed: Jun. 19, 2020

(65) Prior Publication Data
US 2021/0392858 A1 Dec. 23, 2021

(51) Int. Cl.
*A01K 39/012* (2006.01)

(52) U.S. Cl.
CPC .................. *A01K 39/012* (2013.01)

(58) Field of Classification Search
CPC ... A01K 39/012; A01K 39/01; A01K 39/0113
See application file for complete search history.

(56) References Cited

U.S. PATENT DOCUMENTS

| | | | | |
|---|---|---|---|---|
| 5,558,040 | A * | 9/1996 | Colwell | A01K 39/012 119/52.2 |
| 5,975,015 | A * | 11/1999 | Runyon | A01K 39/012 119/52.2 |
| 7,409,922 | B1 * | 8/2008 | Baynard | A01K 39/012 119/52.3 |
| 2003/0127056 | A1 * | 7/2003 | Chrisco | A01K 39/014 119/52.2 |
| 2005/0139163 | A1 * | 6/2005 | Swift | A01K 39/012 119/52.2 |
| 2008/0029035 | A1 * | 2/2008 | Gou | A01K 39/012 362/253 |
| 2008/0156269 | A1 * | 7/2008 | Greenwood | A01K 39/012 119/51.01 |
| 2011/0088626 | A1 * | 4/2011 | Hepp | A01K 39/012 119/52.4 |
| 2012/0111278 | A1 * | 5/2012 | Greenwood | A01K 39/0106 119/51.01 |
| 2014/0261200 | A1 * | 9/2014 | Tu | A01K 39/012 119/57.8 |
| 2017/0094949 | A1 * | 4/2017 | Haberle | A01K 39/0113 |

* cited by examiner

*Primary Examiner* — Trinh T Nguyen
(74) *Attorney, Agent, or Firm* — Endurance Law Group PLC

(57) ABSTRACT

A bird feeder has an outer housing, an internal floor portion, an internal floor portion, an inner housing and port. The outer housing has an interior cavity. The internal floor portion is affixed to an inner periphery of the outer dividing the interior cavity into an upper interior cavity and a lower interior cavity. The inner housing is located within the upper interior cavity and forms a first reservoir configured to hold bird feed. The outer housing and the inner housing form an inner access corridor in the upper interior cavity. The outer housing has at least one upper access aperture therein to allow access to the inner access corridor and at least one lower aperture therethrough to allow access to the lower interior cavity. The inner housing includes at least one feeding aperture for allowing access to bird feed within the first reservoir.

17 Claims, 3 Drawing Sheets

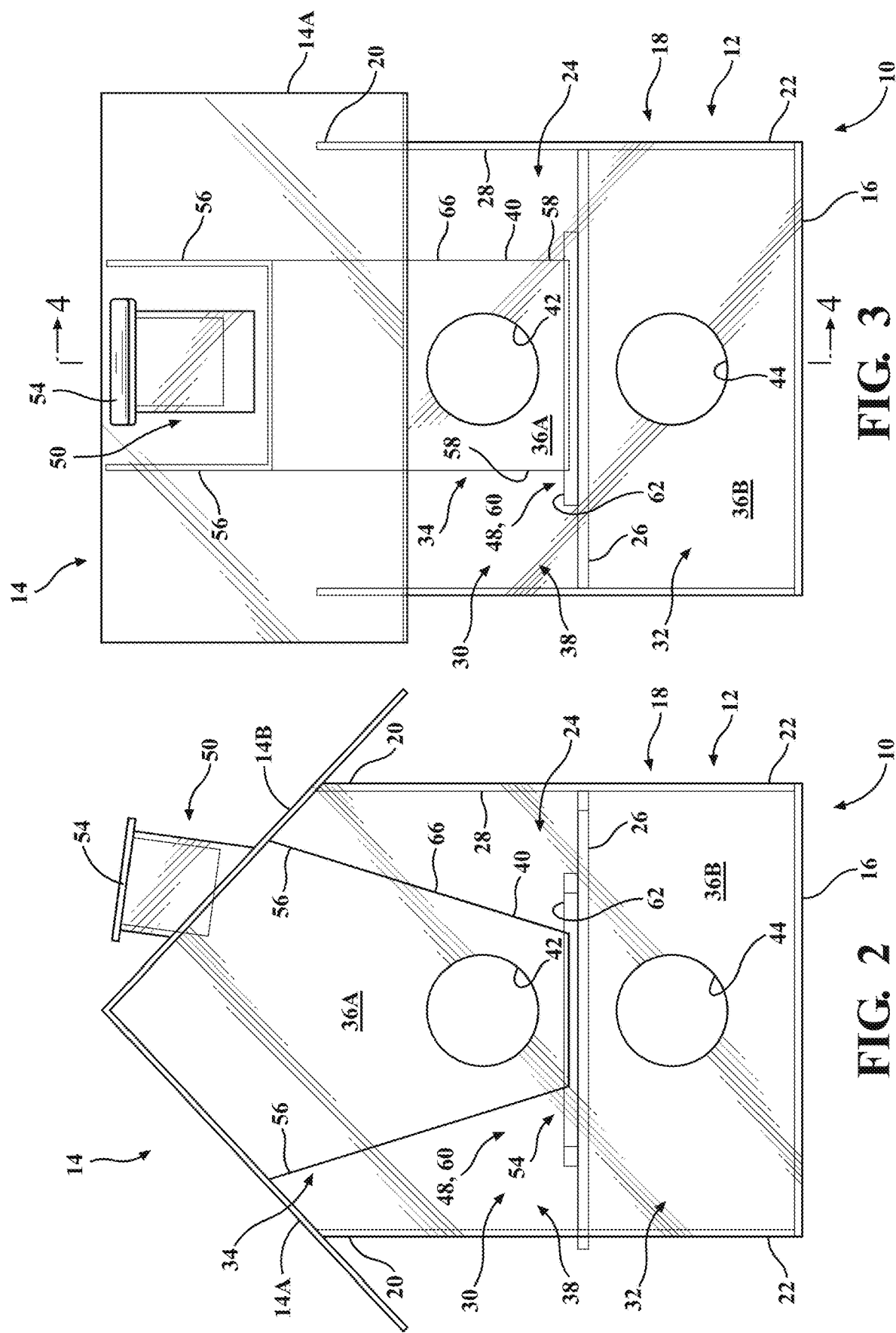

BIRD FEEDER WITH MULTIPLE FEED RESERVOIRS AND FEED STATIONS

FIELD OF THE INVENTION

The invention relates generally to bird feeders, and more particularly, to a bird feeder having multiple feed reservoirs and feed stations.

BACKGROUND OF THE INVENTION

Bird watching and bird feeding, in particular, is a popular hobby and past time. By one account, $2.3 billion is spent by consumers per year on bird feed. Many types of bird feeders are available but experience several problems.

First, most bird feeders are extremely wasteful. Bird feed that that is dropped by feeding birds or that otherwise falls from the bird feeders is either wasted or consumed by other animals (underneath the bird feeder). These unwanted animals may create a mess underneath the bird feeder and present a danger to the birds. Several attempts have been made to collect the spilled bird feed in collectors, but these do not collect all the wasted seed. And further, the collectors must be emptied, and the feed reinserted into the bird feeder or thrown away.

Another problem presented by present bird feeders is that portions of the bird feed may be inedible, and thus, the birder must be cleaned to remove the inedible portions of the feed.

The present invention is aimed at one or more of the problems identified above.

SUMMARY OF THE INVENTION

In a first aspect of the present, a bird feeder having an outer housing, an internal floor portion, an internal floor portion, an inner housing and port is provided. The outer housing has a top portion, a bottom portion and an outer portion. The outer portion has an upper edge and a lower edge. The upper edge of the outer portion is affixed to the top portion. The lower edge of the outer portion is affixed to the bottom portion. The top portion, the bottom portion and the outer portion form an interior cavity. The internal floor portion is affixed to an inner periphery of the outer portion between the upper edge and the lower edge dividing the interior cavity into an upper interior cavity and a lower interior cavity. The inner housing is located within the upper interior cavity and forms a first reservoir configured to hold bird feed. The outer housing and the inner housing form an inner access corridor in the upper interior cavity between the inner periphery of the outer portion and an outer periphery of the inner housing. The outer housing has at least one upper access aperture therein to allow access to the inner access corridor and at least one lower aperture therethrough to allow access to the lower interior cavity. The inner housing includes at least one feeding aperture for allowing access to bird feed within the first reservoir. The internal floor portion has a plurality of apertures therethrough configured to allow bird feed to drop from the inner access corridor to the lower interior cavity. The port is located within the top portion and allows the first reservoir to be filed with bird feed.

In a second aspect of the present invention a bird feeder having a plurality of side walls, a bottom portion, a top portion, an internal floor portion, a plurality of side walls, a lip portion and a port is provided. Each side wall has first and second side edges. Each side edge of one of the side walls is affixed to a respective side edge of another one of the side walls. Each side wall has an upper edge and a lower edge. The upper edge of each side wall is affixed to the top portion and the lower edge of each side wall is affixed to the bottom portion. The top portion, the bottom portion and the side walls form an outer housing having an interior cavity. The internal floor portion is affixed to an inner surface of each of the side walls between the upper edge and the lower edge dividing the interior cavity into an upper interior cavity and a lower interior cavity. The inner side walls are located within the upper interior cavity. The inner side walls and a portion of the internal floor portion form an inner housing having a first reservoir. Each inner side wall has a top edge and a bottom edge. The top edge of each inner side wall is affixed to an inner surface of the top portion. The inner side walls extend from the top portion. The bottom edge of the side walls is located a predetermined distance from a top surface of the internal floor portion forming a gap. The plurality of inner side walls, the side walls of the outer housing and the inner side walls forming an inner access corridor in the upper interior cavity between the inner periphery of the outer portion and an outer periphery of the inner housing. The outer housing has at least one upper access aperture therein to allow access to the inner access corridor and at least one lower aperture therethrough to allow at least access to the lower interior cavity. The internal floor portion has a plurality of apertures therethrough configured to allow bird feed to drop from the inner access corridor to the lower interior cavity. One or more of the inner side walls are sloped such that at least one width of the inner housing decreases as the inner housing extends away from the top portion. The lip portion is affixed to the top surface of the internal floor portion. The gap and the lip portion forming a trough. The port is located within the top portion for allowing the first reservoir to be filed with bird feed.

BRIEF DESCRIPTION OF THE DRAWINGS

Other advantages of the present invention will be readily appreciated as the same becomes better understood by reference to the following detailed description when considered in connection with the accompanying drawings.

FIG. 2 is a first side view of the bird feeder of FIG. 1.

FIG. 3 is a second side view of the bird feeder of FIG. 1.

DETAILED DESCRIPTION OF INVENTION

Figure 1:
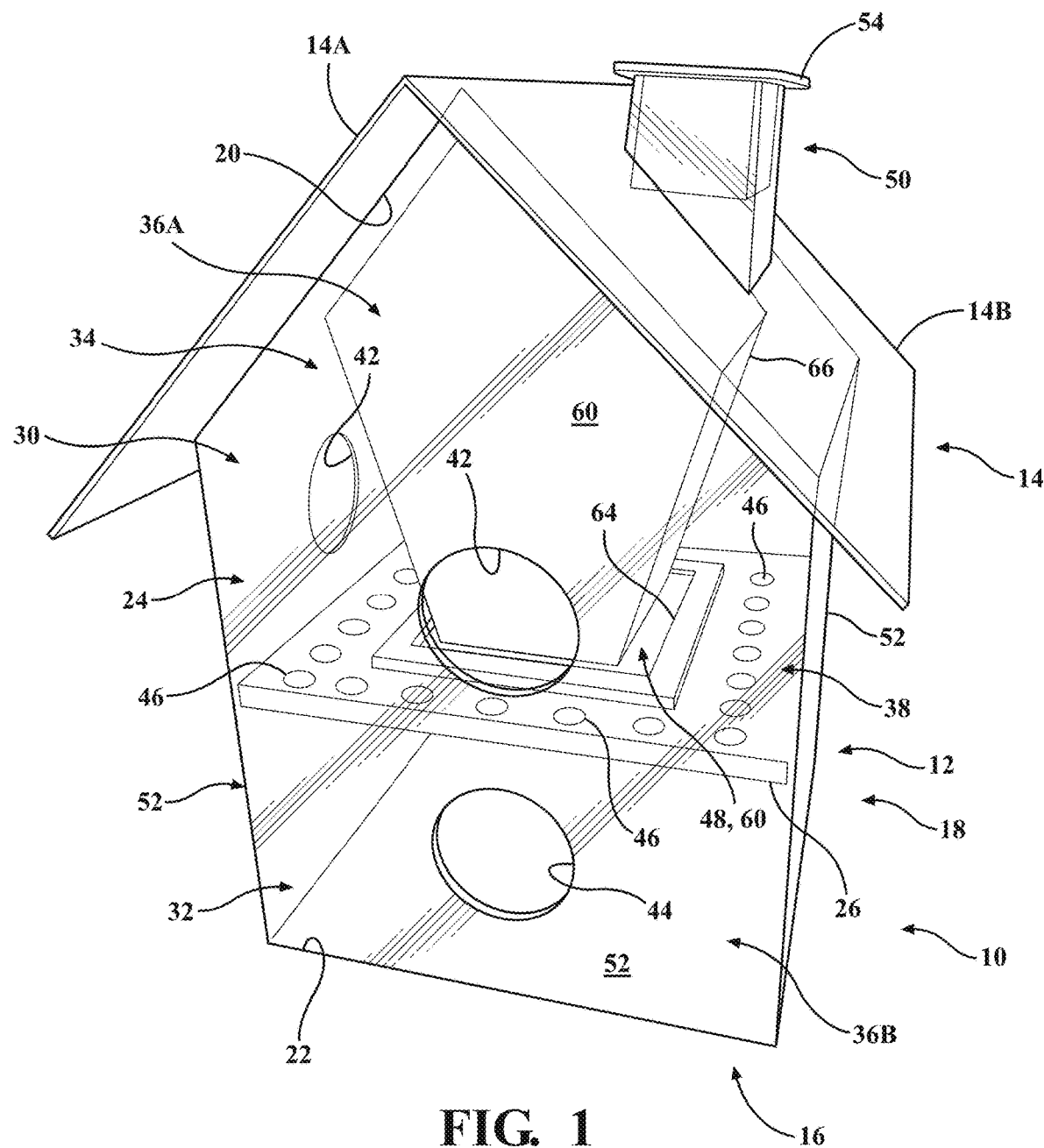
FIG. 1 is a first isometric view of a bird feeder according to an embodiment of the present invention.

Referring to the Figures, wherein like numerals indicate like or corresponding parts throughout the several views, a birder feeder 10 that includes an outer housing 12 and an inner housing 34. The outer housing 12 and the inner housing 34 form first and second reservoirs 36A, 36B for holding bird feed, e.g., bird seed, and to provide access to the bird feed to birds. In general, the first reservoir 36A is located above the second reservoir 36B. As explained in further detail below, the birder feeder 10 is configured to allow bird feed that is dropped or escapes the first reservoir 36A to drop into the second reservoir 36B. Further the second reservoir 36B is configured to allow debris, such as inedible portions of the bird feed, e.g., seed shells, to be blown out from second reservoir 36B (see below), thereby minimizing or eliminating the need for cleaning of the bird feeder 10.

Further in some embodiments, some or all of the components (see below) of the bird feeder 10 including the outer and inner housing 12, 34 may be made of a transparent material such as transparent thermoplastic (which may be known as acrylic, acrylic glass, or plexiglass), glass or other suitable material. The transparent material may be slightly tinted. The use of transparent material for at least one of the components of the bird feeder allow birds to identify threats, including, but not limited to, other birds and/or predators.

In other embodiments, some or all of the components may be made from non-transparent material, including but not limited to, wood, translucent plastic, opaque plastic and the like.

Further, some or all of components may be formed separately and affixed together by one or more of the following: adhesives and fasteners. Fasteners may include nails, screws, bolts, brackets, other suitable fasteners or fastening means and/or a combination thereof.

One or more of the components identified below may be unilaterally formed, e.g., thermoplastic mold process or by a three-dimensional printer.

In the illustrated embodiment, all components of the bird feeder 10 may be composed from a transparent material, such as transparent thermoplastic which are affixed using an adhesive. The bird feeder 10 includes the outer housing 12, a top portion 14, a bottom portion 16 and an outer portion 18.

In the illustrated embodiment, the top portion 14 includes two roof sections 14A, 14B that slope in opposite directions and that are placed such that the highest, horizontal edges meet to form a roof ridge 14C. The outer portion 18 has an upper edge 20 and a lower edge 22. The upper edge 20 of the outer portion 18 is affixed to the top portion 14. The lower edge 22 of the outer portion 18 is affixed to the bottom portion 16. The top portion 14, the bottom portion 16, and the outer portion 18 form an interior cavity 24.

In one embodiment, the outer portion 18 has a circular cross section. In another embodiment, the outer portion 18 has a rectangular cross-section, e.g., square.

The outer portion 18 may include one or more side walls 52, e.g., two, three, four or more side walls. In the illustrated embodiment, the outer portion 18 includes four side walls 52. However, it should be noted that the outer portion 18 could include any number of side walls 52. In one embodiment, the outer portion 18 could include a single side wall, i.e., the outer portion 18 has a circular, oval, or other shape without corners or edges. In another embodiment, the outer portion 18 may have two side walls, a flat side wall and a curved or semi-circular side or other curved side wall 52.

In the illustrated embodiment, the outer portion 18 includes four side walls 52. Each side wall 52 having first and second side edges. Each side edge of one of the side walls being affixed to a respective side edge of another one of the side walls to form the outer portion 18.

The bird feeder 10 may also include an internal floor portion 26 affixed to an inner periphery of the outer portion 18 between the upper edge 20 and the lower edge 20 thereby dividing the interior cavity 24 into an upper interior cavity 30 and a lower interior cavity 32. As shown, the internal floor portion 26 includes a plurality of apertures or floor apertures 46 therethrough. The floor apertures 46 allow bird feed to drop from the inner access corridor to the lower interior cavity.

As shown in the illustrated embodiment, the inner housing being 34 is located within the upper interior cavity 30. The inner housing 30 forms the first reservoir 36A.

The first reservoir 36A is configured to hold bird feed. A port 50 is provided with the top portion 14 to allow the first reservoir 36A to be filled with bird feed. A cap 54 may be provided to cover/shield the port 50 when the bird feeder 10 is in use and/or not being filled with bird feed.

The outer housing 12 and the inner housing 34 form an inner access corridor 38 in the upper interior cavity 30 between the inner periphery of the outer portion 18 and an outer periphery of the inner housing 34. The outer housing 12 includes at least one upper access aperture 42 therein to allow access to the inner access corridor 38. In use, birds may enter the inner access corridor 38 through the at least upper access aperture 42 to access the bird feed in the first reservoir 36A.

In the illustrated embodiment, the inner access corridor 38 extends around the inner housing 34 between the side walls 52 and the inner housing 34. However, in other embodiments, the inner access corridor 38 may extend only partially around the inner housing 34.

The outer housing 12 and/or the side walls 52 may include at least one lower aperture 44 therethrough to allow access to the lower interior cavity 32 and/or the second reservoir 36B and the bird feed located therein. In the illustrated embodiment, each side wall 52 includes an upper aperture 42 and a lower aperture 44. In one embodiment, a lower edge of each lower aperture is one inch from the bottom portion 16.

Figure 4:
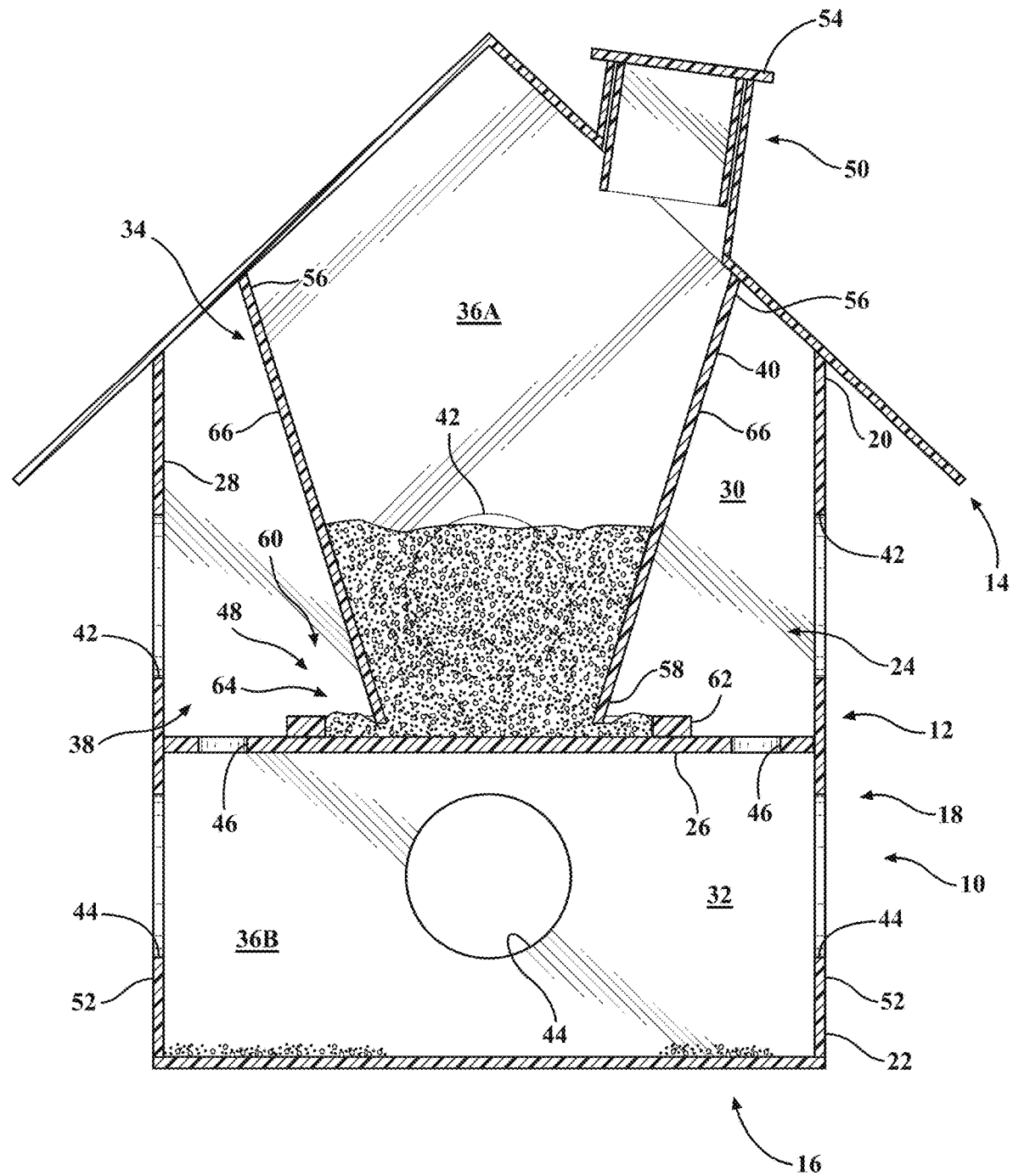
FIG. 4 is cutaway view of the bird feeder of FIG. 1.

In the illustrated embodiment, the inner housing 34 has a top edge 56 and a bottom edge 58 (see FIG. 4). The top edge 56 of the inner housing 34 is affixed to an inner surface of the top portion 14. The inner housing 34 extends from the top portion 34. The bottom edge 58 of the inner housing 34 is located a predetermined distance from a top surface of the internal floor portion 26 forming a gap 46. In one embodiment, the gap 46 forms at least one feeding aperture 60 for allowing access to bird feed within the first reservoir 36A from within the inner access corridor 38. A lip portion 62 may be affixed to the top surface of the internal floor portion 16. The gap 48 and the lip portion 62 form a trough 64. Bird feed from the first reservoir 36A is gravity fed from through the gap 62 to fill the trough 64.

In other embodiments, the feed aperture 60 may be formed otherwise. For example, the bottom edge 58 of the inner housing 34 may be affixed to the internal floor portion 26 and one or more feed apertures 60 may be provided within the inner housing 34.

A secondary port (not shown) may be provided to add bird feed directly to the second reservoir 36B.

In one aspect of the present invention, the inner housing 34 has a width that decreases as the inner housing 34 extends away from the top portion 14.

In the illustrated embodiment, the inner housing 34 includes one or more inner side walls 66. In general, the shape of the inner housing 34 may be similar to the shape of the outer housing 12, however, the inner housing 34 may have a different basic shape than the outer housing 12. For instance, if the outer housing 12 has a circular cross-section, the inner housing 34 may also have a single inner side wall 66 and a circular cross-section. In the illustrated embodiment, the outer housing 12 has four side walls 52 and the inner housing 34 has four inner side walls 66. The inner side walls 66 and a portion of the internal floor portion 26 form the first reservoir 36A. As shown in the illustrated embodiment, one or more of the inner side walls 66 may be inwardly sloped such that at least one width of the inner housing 34 decreases as the inner housing 34 extends away from the top portion 14.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics described herein may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale. Several (or different) elements discussed below, and/or claimed, are described as being "affixed", "coupled" or "connected" or the like. This terminology is intended to be non-limiting.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Obviously, many modifications and variations of the present invention are possible in light of the above teachings. The invention may be practiced otherwise than as specifically described within the scope of the appended claims.

What is claimed is:

1. A bird feeder, comprising:
an outer housing having a top portion, a bottom portion and an outer portion, the outer portion having an upper edge and a lower edge, the upper edge of the outer portion being affixed to the top portion, the lower edge of the outer portion being affixed to the bottom portion, the top portion, the bottom portion and the outer portion forming an interior cavity;
an internal floor portion affixed to an inner periphery of the outer portion between the upper edge and the lower edge dividing the interior cavity into an upper interior cavity and a lower interior cavity;
an inner housing being located within the upper interior cavity, the inner housing forming a first reservoir configured to hold bird feed, the outer housing and the inner housing forming an inner access corridor in the upper interior cavity between the inner periphery of the outer portion and an outer periphery of the inner housing, the outer housing having at least one upper access aperture therein to allow access to the inner access corridor and at least one lower aperture therethrough to allow access to the lower interior cavity, the inner housing including at least one feeding aperture for allowing access to bird feed within the first reservoir, the internal floor portion having a plurality of apertures therethrough configured to allow bird feed to drop from the inner access corridor to the lower interior cavity; and,
a port located within the top portion for allowing the first reservoir to be filed with bird feed.

2. A bird feeder, as set forth in claim 1, wherein the outer portion includes a plurality of side walls, each side wall having first and second side edges, each side edge of one of the side walls being affixed to a respective side edge of another one of the side walls.

3. A bird feeder, as set forth in claim 2, wherein the outer portion includes at least three side walls.

4. A bird feeder, as set forth in claim 2, wherein the outer portion includes four side walls.

5. A bird feeder, as set forth in claim 1, wherein the outer portion has a rectangular cross-section.

6. A bird feeder, as set forth in claim 1, wherein the outer portion has a circular cross-section.

7. A bird feeder, as set forth in claim 1, wherein the outer portion is composed from a transparent material.

8. A bird feeder, as set forth in claim 7, wherein the top portion, the bottom portion, the internal floor portion and the inner housing are composed from a transparent material.

9. A bird feeder, as set forth in claim 1, wherein the inner housing has a rectangular cross-section.

10. A bird feeder, as set forth in claim 1, wherein the inner housing has a circular cross-section.

11. A bird feeder, as set forth in claim 1, wherein the inner housing has a top edge and a bottom edge, wherein the top edge of the inner housing is affixed to an inner surface of the top portion, the inner housing extending from the top portion, the bottom edge of the inner housing being located a predetermined distance from a top surface of the internal floor portion forming a gap.

12. A bird feeder, as set forth in claim 11, further comprising a lip portion affixed to the top surface of the internal floor portion, the gap and the lip portion forming a trough.

13. A bird feeder, as set forth in claim 1, wherein the inner housing has a width that decreases as the inner housing extends away from the top portion.

14. A bird feeder, as set forth in claim 1, wherein the inner housing includes a plurality of inner side walls, the inner side walls and a portion of the internal floor portion forming the first reservoir.

15. A bird feeder, as set forth in claim 14, wherein one or more of the inner side walls are sloped such that at least one width of the inner housing decreases as the inner housing extends away from the top portion.

16. A bird feeder, as set forth in claim 1, wherein the inner access corridor extends around the entire inner periphery of the outer portion.

17. A bird feeder, comprising:
a plurality of side walls, each side wall having first and second side edges, each side edge of one of the side walls being affixed to a respective side edge of another one of the side walls;
a bottom portion;
a top portion, wherein each side wall has an upper edge and a lower edge, the upper edge of each side wall being affixed to the top portion, the lower edge of each side wall being affixed to the bottom portion, the top portion, the bottom portion and the side walls forming an outer housing having an interior cavity;
an internal floor portion affixed to an inner surface of each of the side walls between the upper edge and the lower edge dividing the interior cavity into an upper interior cavity and a lower interior cavity;

a plurality of inner side walls located within the upper interior cavity, the inner side walls and a portion of the internal floor portion forming an inner housing having a first reservoir, each inner side wall having a top edge and a bottom edge, the top edge of each inner side wall being affixed to an inner surface of the top portion, the inner side walls extending from the top portion, the bottom edge of the side walls being located a predetermined distance from a top surface of the internal floor portion forming a gap, the plurality of inner side walls, the side walls of the outer housing and the inner side walls forming an inner access corridor in the upper interior cavity between the inner periphery of the outer housing and an outer periphery of the inner housing, the outer housing having at least one upper access aperture therein to allow access to the inner access corridor and at least one lower aperture therethrough to allow at least access to the lower interior cavity, the internal floor portion having a plurality of apertures therethrough configured to allow bird feed to drop from the inner access corridor to the lower interior cavity, wherein one or more of the inner side walls are sloped such that at least one width of the inner housing decreases as the inner housing extends away from the top portion;

a lip portion affixed to the top surface of the internal floor portion, the gap and the lip portion forming a trough; and, a port located within the top portion for allowing the first reservoir to be filed with bird feed.

* * * * *